(12) United States Patent
Nakada

(10) Patent No.: US 6,256,926 B1
(45) Date of Patent: Jul. 10, 2001

(54) METHOD OF CULTIVATING BEAN SPROUTS AND CULTIVATING CONTAINER THEREFOR

(75) Inventor: Masahiro Nakada, Davis, CA (US)

(73) Assignee: Salad Cosmo, U.S.A. Corp., Dixon, CA (US)

( * ) Notice: Subject to any disclaimer, the term of this patent is extended or adjusted under 35 U.S.C. 154(b) by 0 days.

(21) Appl. No.: 09/406,174

(22) Filed: Sep. 23, 1999

(51) Int. Cl.$^7$ ............................................ A01G 31/00
(52) U.S. Cl. ............................................................ 47/61
(58) Field of Search .................. 47/14, 58.1, 59, 47/60, 61, 63, 64, 65.8

(56) References Cited

U.S. PATENT DOCUMENTS

| | | |
|---|---|---|
| 3,421,836 | 1/1969 | Sundin et al. . |
| 3,897,210 | 7/1975 | Gruber et al. . |
| 3,911,619 * | 10/1975 | Dedolph ............................... 47/14 |
| 4,376,130 | 3/1983 | Astrack et al. . |
| 4,551,942 * | 11/1985 | Brown ................................... 47/14 |
| 4,765,092 * | 8/1988 | Cline .................................... 47/61 |
| 4,849,237 | 7/1989 | Hurst . |
| 5,025,589 * | 6/1991 | Park ..................................... 47/61 |
| 5,326,543 | 7/1994 | Fiorenzano, Jr. . |
| 5,514,345 | 5/1996 | Garbutt et al. . |
| 5,636,474 * | 6/1997 | Lo ........................................ 47/61 |
| 5,862,628 * | 1/1999 | Takashima ........................ 47/65.8 |

FOREIGN PATENT DOCUMENTS

| | | |
|---|---|---|
| 61-247366 | 11/1986 | (JP) . |
| 1-309671 | 12/1989 | (JP) . |

* cited by examiner

Primary Examiner—Charles T. Jordan
Assistant Examiner—Francis T. Palo
(74) Attorney, Agent, or Firm—Bernhard Kreten

(57) ABSTRACT

A method of cultivating bean sprouts includes the steps of germinating seeds of bean sprouts in a cultivating container so that bean sprouts grow and turning the cultivating container upside down together with the bean sprouts in the middle of cultivation so that the bean sprouts grow in an upside-down state. The cultivating container has a cylindrical or conical shape, or an elliptical section such that the container has an inner circumference with a gentle curvature.

5 Claims, 4 Drawing Sheets

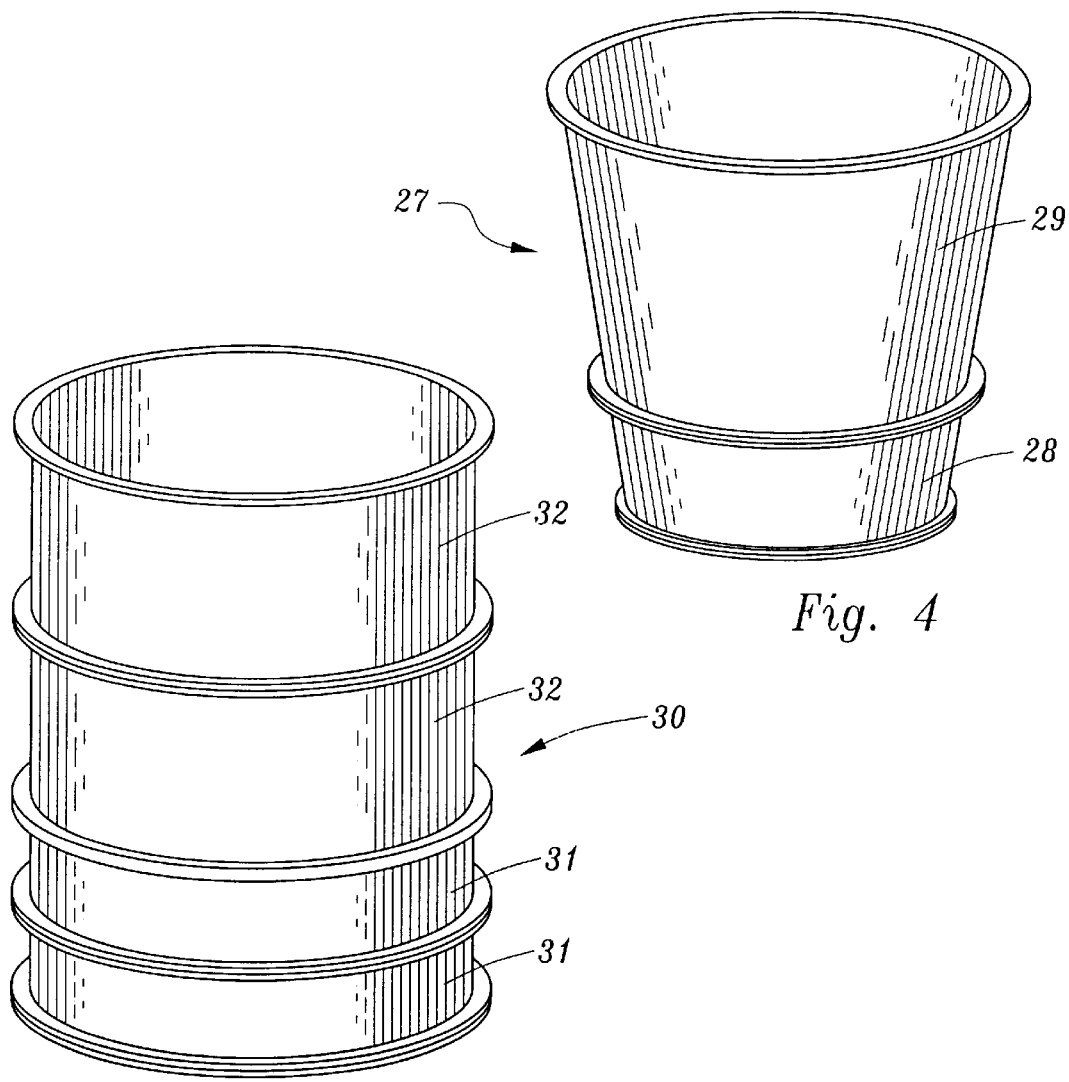
Fig. 4
Fig. 5
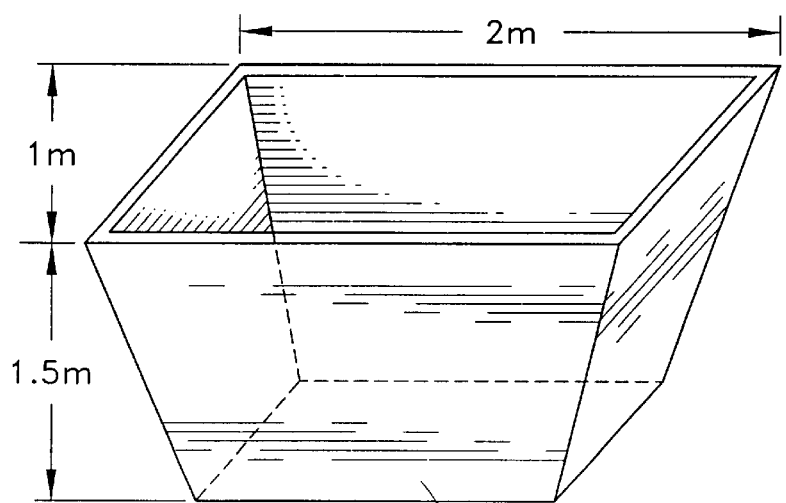
Fig. 6
(Prior Art)

METHOD OF CULTIVATING BEAN SPROUTS AND CULTIVATING CONTAINER THEREFOR

BACKGROUND OF THE INVENTION

1. Field of the Invention

This invention relates to a method of germinating seeds of bean sprouts in a cultivating container, thereby cultivating bean sprouts, and further to the cultivating container.

2. Description of the Prior Art

FIG. 6 shows one of conventional methods of cultivating bean sprouts. The shown method uses a cultivating container 11 formed into the shape of a truncated pyramid and measured 1 meter by 2 by 1.5 high. A multitude of seeds are put into the cultivating container 11, and water is sprinkled over the seeds so that the seeds are germinated to be grown into bean sprouts. In this method, the bean sprouts grow, lying one upon another into many layers. Thus, the bean sprouts of upper layers are gradually raised upward with growth of the bean sprouts of lower layers. Accordingly, a location of the bean sprouts of the uppermost layer in the cultivating container 11 depends upon an amount of seeds put into the container or the height of the heaped seeds. Generally, bean sprouts grow into a length suitable for food (6 to 8 cm) in five to eight days after germination. The bean sprouts are taken out of the cultivating container 11 at this stage of growth to be packaged by a predetermined amount for shipment.

Consumers generally have a fondness for thick, straightforward, whitish bean sprouts. The thick bean sprouts are hard to masticate, crisping. The straightforward, whitish bean sprouts give a tasty impression. In view of these tastes of the consumers, producers of bean sprouts aim at cultivating the thick, straightforward, whitish bean sprouts.

In the above-described conventional method, bean sprouts grow slender or thin. Further, the cultivating container 11 has an upper opening so that water is sprinkled therethrough. Accordingly, the bean sprouts of the uppermost layer in the cultivating container 11 grow in the light such that the bean sprouts turn green or yellow. The bean sprouts of the uppermost layer thus loose the commercial value and need to be dumped away. This reduces the yield of the bean sprouts.

SUMMARY OF THE INVENTION

Therefore, an object of the present invention is to provide a method of cultivating the thick, straightforward, whitish bean sprouts with an increased yield and a cultivating container therefor.

To accomplish the object, the present invention provides a method of cultivating bean sprouts in which a cultivating container is turned upside down together with the bean sprouts in the middle of cultivation so that the bean sprouts grow in an upside-down state. When the bean sprouts grow in the upside-down state, stress is exerted on the bean sprouts such that the bean sprouts become thicker. Further, since the bean sprouts grow in a crowded state in the container, the bean sprouts grow straightforward without bending. When the bean sprouts thicken, the crowded state becomes tighter. The tightness further increases the stress on the bean sprouts so that the bean sprouts become further thicker. Further, the bean sprouts located in the uppermost layer in the container turned upside down, which is originally located in a lowermost layer, exposes only their roots to the sun light. Sprouts of the bean sprouts, which portion are marketable, are covered with the roots such that the bean sprouts of the uppermost layer become whitish as well as the bean sprouts of the lower layers. Thus, since the bean sprouts of the uppermost layer can be shipped, the yield is improved.

The cultivating method of the present invention can be applied to every shape of the cultivating container. However, when a square cultivating container is used, for example, the degree of crowdedness of the bean sprouts in a corner of the container differs from that of the bean sprouts in other portions of the container. This results in non-uniformity in the crowdedness of the bean sprouts in the cultivating container. Accordingly, when water is sprinkled into the cultivating container, a uniform degree of penetration of the water cannot be obtained over the interior of the container. As a result, the growth of the bean sprouts becomes non-uniform, and the bean sprouts in an ill-drained part in the container get rotten. Further, the bean sprouts bend where the degree of crowdedness of the bean sprouts is low.

In view of the above-described problem, the cultivating container preferably has a cylindrical or conical shape, or an elliptical section such that the container has an inner circumference with a gentle curvature. When the container has an inner circumference with a gentle curvature, the bean sprouts become movable in the container gradually with the growth, whereupon the degree of crowdedness of the bean sprouts can be uniformed. Since this uniforms the degree of penetration of the water in the container, the bean sprouts grow uniformly in the container and can be prevented from getting rotten and bending.

The cultivating container is preferably divided into a lower container and an upper container. The above-described turning step further comprises the steps of detachably attaching a water-penetrating plate to a bottom of the lower container, covering, by the water-penetrating plate, an open top of the lower container when the seeds are germinated in the lower container and the lower container is substantially filled up with the growing bean sprouts, turning the lower container upside down together with the bean sprouts so that the water-penetrating plate located at the upper side of the lower container is detached, and connecting the upper container to the lower container so that the bean sprouts grow in the upper container in the upside-down state.

In a case where the lower container is turned upside down when being substantially filled up with the growing bean sprouts, distal or lower ends of the bean sprouts of the lowermost layer (originally, the uppermost layer) in the lower container substantially abut the bottom plate. In this state, the bean sprouts in the lower container tend to grow downward. However, since the movement of the distal end of the bean sprouts of the lowermost layer is blocked by the bottom plate, the root portions of the bean sprouts are raised with the growth thereof. As a result, the bean sprouts in the lower container are pushed up into the upper container in the upside-down state with the growth thereof. The bean sprouts grow in the upside-down state in the upper container. Stress due to the growth in the upside-down state thickens the bean sprouts, whereupon the crowded state of the bean sprouts in the upper container becomes tighter. The tightness further increases the stress on the bean sprouts so that the bean sprouts become further thicker.

BRIEF DESCRIPTION OF THE DRAWINGS

Other objects, features and advantages of the present invention will become clear upon reviewing the following description of the preferred embodiment, made with reference to the accompanying drawings, in which:

FIG. 4 is a perspective view of a conical cultivating container;

FIG. 5 is a perspective view of a multistage dividable cultivating container; and FIG. 6 is a perspective view of a conventional cultivating container.

DETAILED DESCRIPTION OF THE PREFERRED EMBODIMENT

Figure 1:
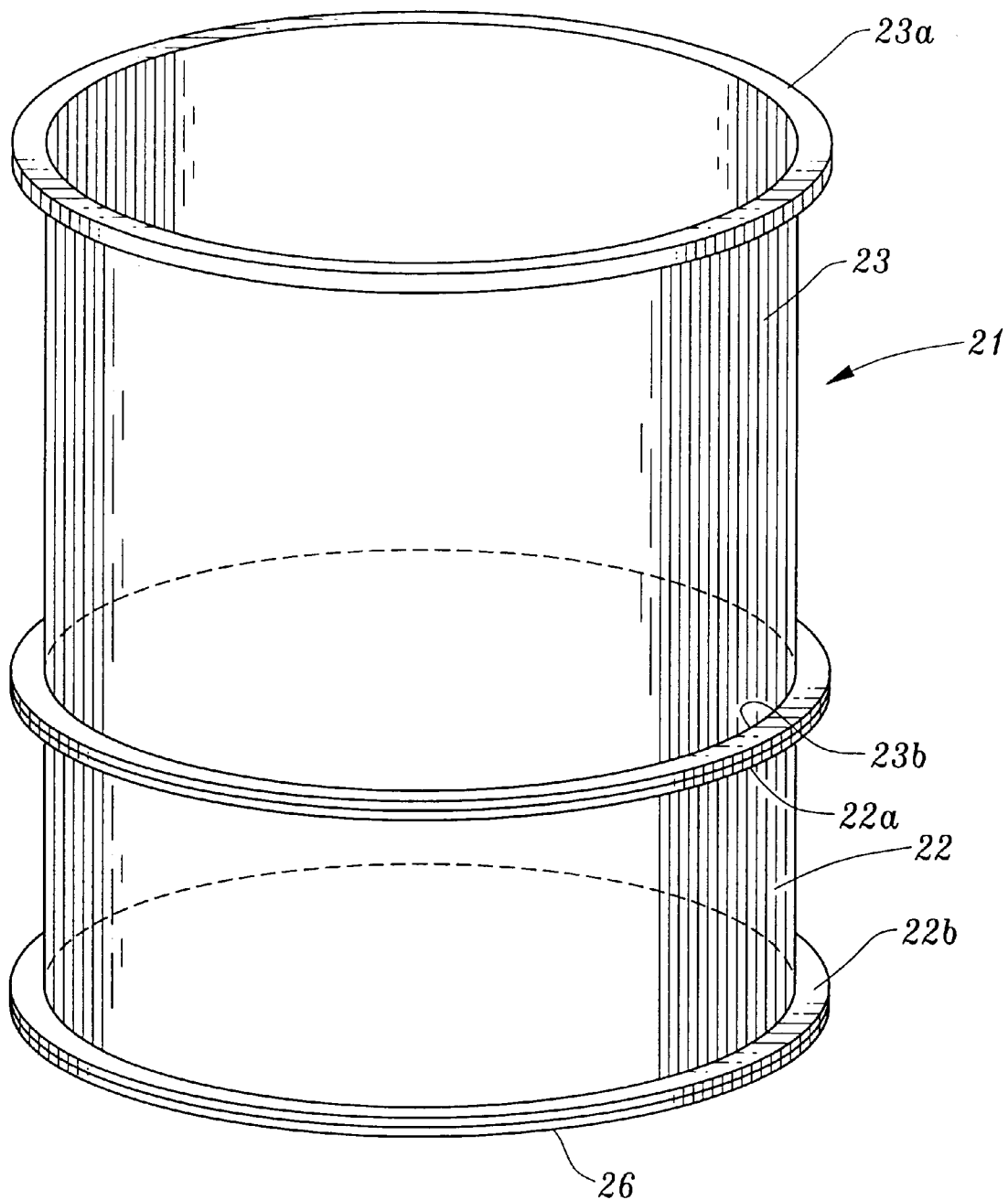
FIG. 1 is a perspective view of a cylindrical cultivating container employed in one embodiment of the present invention.
Figure 2A:
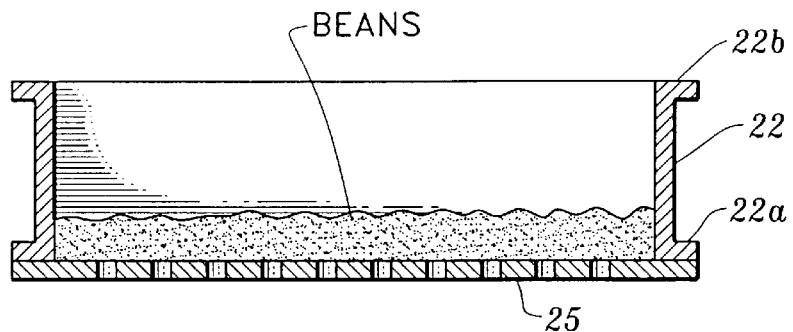
FIGS. 2A to 2E are longitudinally sectional views of a lower container in different stages of growth of bean sprouts, explaining the cultivating method of the invention.
Figure 2B:
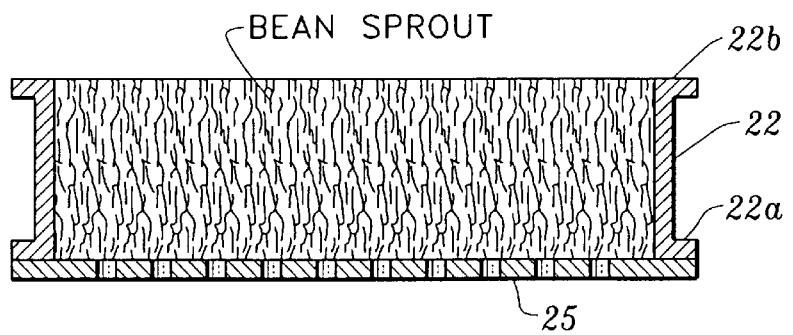
Figure 2C:
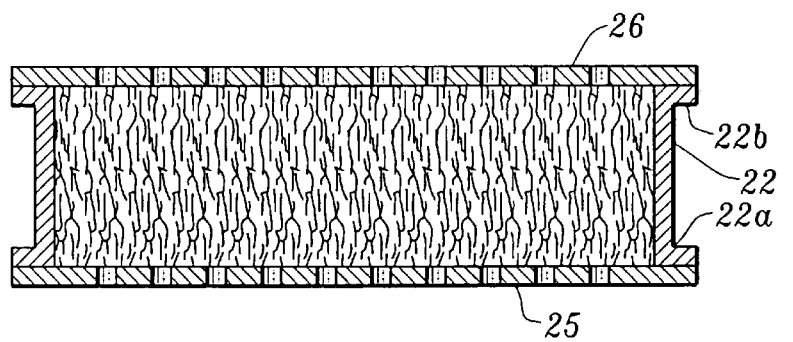

One embodiment of the present invention will be described with reference to FIGS. 1 to 5. The construction of a cultivating container 21 will first be described with reference to FIGS. 1 to 3B. The cultivating container 21 is divided into two parts, that is, a cylindrical lower container 22 and a cylindrical upper container 23 both having the same diameter. The lower container 22 has two flanges 22a and 22b formed on upper and lower ends thereof respectively. The upper container 23 also has two flanges 23a and 23b formed on upper and lower ends thereof respectively. When the upper container 23 is connected to the lower container 22, a waterproof rubber packing 24 as shown in FIGS. 3A and 3B is held between the upper flange 22a of the lower container 22 and the lower flange 23b of the upper container 23. Both flanges 22a and 23b are then fixed together by fixing means such as bolts or clamps. Water-penetrating bottom plates 25 and 26 are detachably attachable to the flanges 22a and 22b of the lower container 22 by fixing means such as bolts or clamps respectively. Each of the bottom plates 25 and 26 is made of a punching metal having holes smaller than seeds or beans of bean sprouts or a wire netting. Each of the containers 22 and 23 has a diameter ranging between 1 to 2 m. The lower container 22 has a height ranging between several cm and 1 m. The upper container 23 has a height ranging between 1 to 2 m. The size of each container should not be limited to that described above and may be changed.

The method of cultivating bean sprouts with the cultivating container 21 will now be described. Referring to FIG. 2A, the bottom plate 25 is detachably attached to the bottom of the lower container 22 by the fixing means such as bolts or clamps. The seeds of bean sprouts processed for germination are put into the lower container 22. Thereafter, water is sprinkled into the lower container 22 so that the seeds are germinated. The bottom plate 26 is detachably attached to the top of the lower container 22 by the fixing means such as bolts or clamps as shown in FIG. 2C when the interior of the lower container 22 is substantially full of growing bean sprouts as shown in FIG. 2B (for example, second or third day).

Figure 2D:
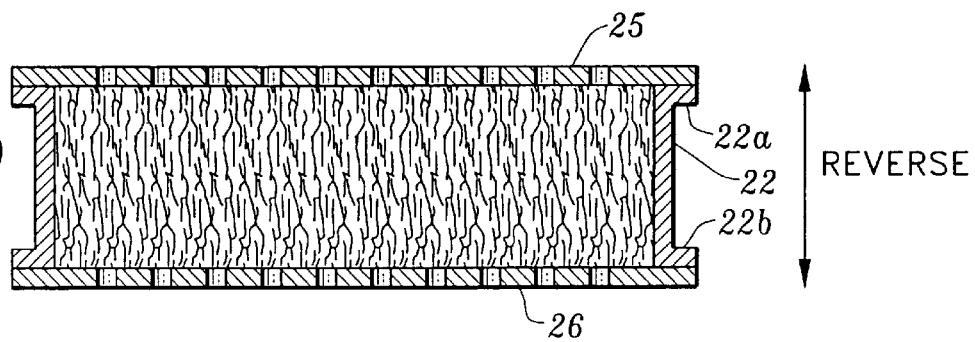
Figure 2E:
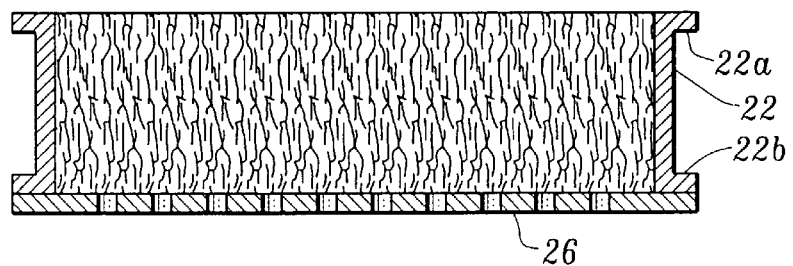
Figure 3A:
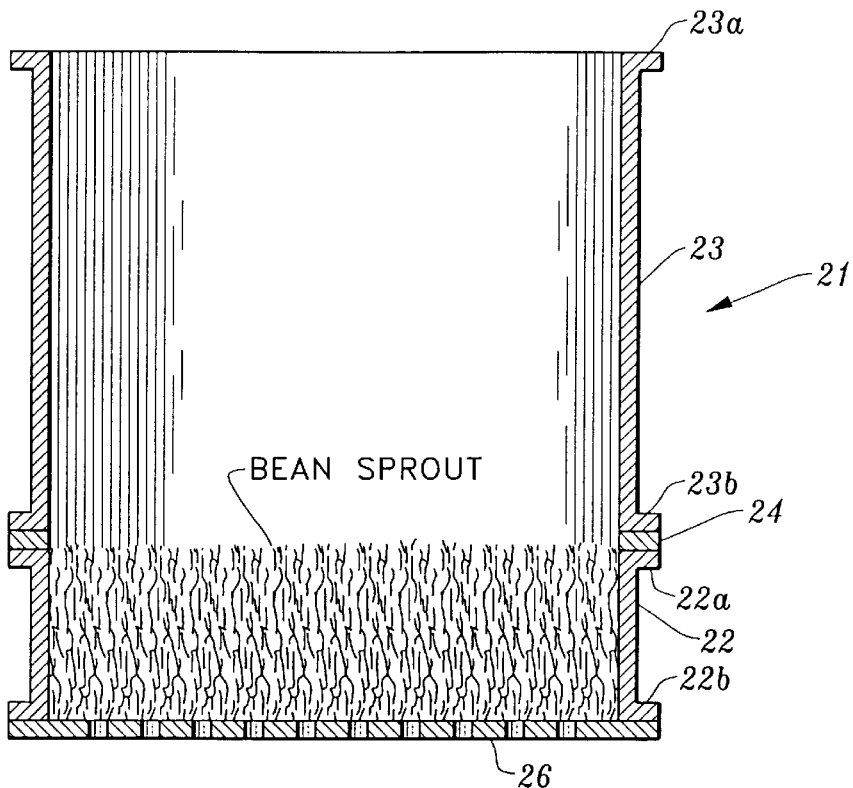
FIGS. 3A and 3B are longitudinally sectional views of a cultivating container in different stages of growth of bean sprouts, explaining the cultivating method of the invention.
Figure 3B:
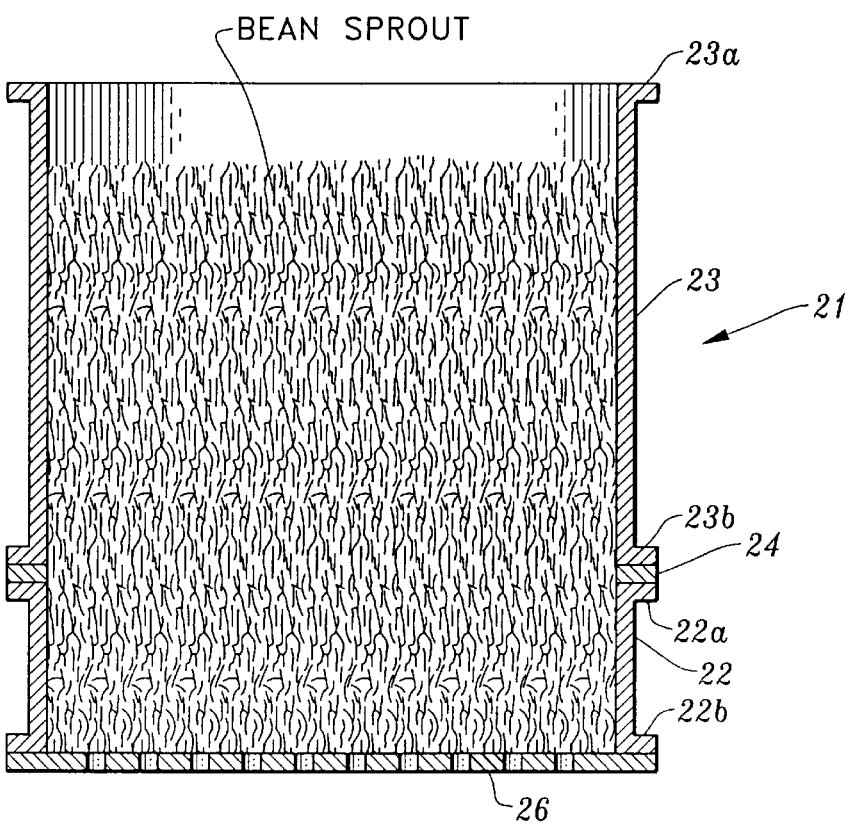

Thereafter, the lower container 22 is turned upside down so that the bean sprouts therein are also turned upside down, as shown in FIG. 2D. Thereafter, the bottom plate 25 located at the upper side of the lower container 22 is detached therefrom as shown in FIG. 2E. The upper container 23 is then connected to the lower container 22 as shown in FIG. 3A. At this time, the waterproof rubber packing 24 is put between the upper flange 22a of the lower container 22 and the lower flange 23b of the upper container 23, and both flanges 22a and 23b are fixed together by the fixing means such as the bolts or clamps.

Thereafter, water is suitably sprinkled into the cultivating container 22 so that the bean sprouts grow in the upside-down state. The bean sprouts in the lower container 22 tend to grow downward. However, since the movement of distal ends of the bean sprouts of a lowermost layer is blocked by the bottom plate 26, the root portions of the bean sprouts are raised with growth of the bean sprouts. As a result, the bean sprouts in the lower container 22 are pushed up into the upper container 23 in the upside-down state with the growth thereof as shown in FIG. 3B. The bean sprouts grow in the upside-down state in the upper container 23. The bean sprouts in the cultivating container 21 grow into a length suitable for food (6 to 8 cm) in five to eight days after germination. The bean sprouts are taken out of the cultivating container 21 at this stage of growth to be packaged by a predetermined amount for shipment.

Stress is exerted on the bean sprouts when the bean sprouts grow in the upside-down state, so that the bean sprouts become thicker. Further, since the bean sprouts grow in a crowded state in the cultivating container 21, the bean sprouts become straightforward without bending. When the bean sprouts thicken, the crowded state becomes tighter. The tightness further increases the stress on the bean sprouts so that the bean sprouts become further thicker. Further, the bean sprouts located in the uppermost layer in the container 21 turned upside down, which are originally located in a lowermost layer, expose only the root portions thereof to the sun light. Sprouts of the bean sprouts, which portions are marketable, are covered with the root portions such that the bean sprouts of the uppermost layer become whitish as well as the bean sprouts of the lower layers. Thus, since the bean sprouts of the uppermost layer can be shipped, the yield is improved.

The cultivating method of the present invention can be applied to every shape of the cultivating container. However, when a square cultivating container is used, for example, the degree of crowdedness of the bean sprouts in a corner of the container differs from that of the bean sprouts in other portions of the container. This results in non-uniformity in the crowdedness of the bean sprouts in the cultivating container. Accordingly, when water is sprinkled into the cultivating container, a uniform degree of penetration of the water cannot be obtained over the interior of the container. As a result, the growth of the bean sprouts becomes non-uniform, and the bean sprouts in an ill-drained part in the container sometimes get rotten. Further, the bean sprouts sometimes bend in a case where the degree of crowdedness of the bean sprouts is low.

In view of the above-described problem, the cylindrical cultivating container 21 is employed in the above-described embodiment. As a result, the bean sprouts move in the container 21 gradually with the growth thereof such that the degree of crowdedness of the bean sprouts can be uniformed. Since this uniforms the degree of penetration of the water in the container 21, the bean sprouts grow uniformly in the container and can be prevented from getting rotten and bending.

The cultivating container should not be limited to the cylindrical shape. A generally conical cultivating container 27 as shown in FIG. 4 may be used, instead. In this case, too, the container 27 can be divided into a lower container 28 and an upper container 29. The same effect can be achieved from the conical cultivating container 27 as from the cylindrical cultivating container 21, and water can be sprinkled more easily.

Moreover, the cultivating container should not be limited to the cylindrical or conical shape. The cultivating container may have an elliptical section such that the container has an inner circumference with a gentle curvature. When the container has an inner circumference with a gentle curvature, the bean sprouts become movable in the container gradually with the growth, whereupon the degree of crowdedness of the bean sprouts can be uniformed. Further, the cultivating container should not be limited to those having an inner circumference with a gentle curvature. A hexagonal, octagonal or square cultivating container may be used, instead.

Although the cultivating container 21 is divided into the two containers in the foregoing embodiment, a cultivating container 30 may include a lower container 31 divided into two, three or more parts and an upper container 32 divided into two, three or more parts, as shown in FIG. 5. In this case, the number of stages of each of the containers 31 and 32 can be changed according to an amount of bean sprouts cultivated in the cultivating container 30.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A method of cultivating bean sprouts comprising the steps of:
    germinating seeds of bean sprouts in a cultivating container so that bean sprouts grow; and
    turning the cultivating container upside down together with the bean sprouts in the middle of cultivation so that the bean sprouts grow in an upside-down state.

2. The method according to claim 1, wherein the cultivating container has a cylindrical or conical shape, or an elliptical section such that the container has an inner circumference with a gentle curvature.

3. The method according to claim 1, wherein the cultivating container is divided into a lower container and an upper container, and the turning step includes the steps of:
    detachably attaching a water-penetrating plate to a bottom of the lower container;
    covering, by the water-penetrating plate, an open top of the lower container when the seeds are germinated in the lower container and the lower container is substantially filled up with the growing bean sprouts;
    turning the lower container upside down together with the bean sprouts so that the water-penetrating plate located at the upper side of the lower container is detached; and
    connecting the upper container to the lower container so that the bean sprouts grow in the upper container in the upside-down state.

4. A cultivating container into which seeds of bean sprouts are put so that the bean sprouts grow and which is then turned upside down in the middle of growing of the bean sprouts so that the bean sprouts grow with the cultivating container being turned upside down, the cultivating container having a cylindrical or conical shape, or an elliptical section such that the container has an inner circumference with a gentle curvature.

5. A cultivating container into which seeds of bean sprouts are put so that the bean sprouts grow, the cultivating container being divided into a lower container and an upper container, the lower container having a bottom and an open top to each of which a water-penetrating plate is detachably attached, the water-penetrating plate being detachably attached to the bottom of the lower container, the top of the lower container being covered with the water-penetrating plate when the seeds are germinated in the lower container and the lower container is substantially filled up with the growing bean sprouts, the lower container being turned upside down together with the bean sprouts so that the water-penetrating plate located at the upper side of the lower container is detached, the upper container being connected to the lower container so that the bean sprouts grow in the upper container in the upside-down state.

* * * * *